United States Patent Office 3,068,196
Patented Dec. 11, 1962

3,068,196
HALOETHYLENE POLYMERS STABILIZED WITH ESTERS OF POLYCARBOXYLIC ACIDS
David A. Gordon, Midland, Mich., assignor to The Dow Chemical Company, Midland, Mich., a corporation of Delaware
No Drawing. Filed Apr. 20, 1960, Ser. No. 23,353
7 Claims. (Cl. 260—45.85)

This invention relates to new and improved thermoplastic compositions. More particularly, it relates to plasticized polymeric haloethylene compositions having improved stability to the degradative effects of light, particularly ultraviolet light.

Thermoplastic compositions, particularly those prepared from haloethylene polymers, have found wide acceptance as useful materials for making foils, fibers, filaments and other articles. It has been found desirable to incorporate in such compositions plasticizing materials to render the articles made therefrom dimensionally stable and flexible over a wide range of temperatures. One disadvantage of some prior art plasticizers used in haloethylene polymers is that polymers containing such plasticizers are limp and, accordingly, articles made therefrom do not retain their shape. Another disadvantage of polymers containing liquid or oily plasticizers is that articles prepared therefrom have a wet, sticky feeling resulting in dirt pickup and adherence problems. This is undesirable in such products as carpets, upholstery, seat covers, etc. made from such polymeric materials.

Articles prepared from haloethylene polymers are subject to rapid and severe degradation and consequent discoloration due to the effects of light, particularly sunlight and ultraviolet light. The problem becomes most serious when such polymeric compositions are employed as filamentary materials in making window curtains, automobile seat covers, and other articles which are exposed for prolonged periods of time to direct sunlight. To overcome this disadvantage, it has been the practice to incorporate certain additives into the composition to stabilize it to the effects of light. Some of the prior light stabilizing materials have suffered from the disadvantages of bleeding out of articles made from polymeric vinyl or vinylidene halides. In addition, some of the materials are colored so that they impart an objectionable initial color to the composition which prevents the production of white articles. In addition, many of the prior art stabilizers lose their effectiveness after exposure to sunlight for a short time.

It is accordingly an object of this invention to provide improved polymeric compositions containing an additive which imparts both plasticizing and light stabilizing properties to the polymer.

It is a particular object of the invention to provide such a composition based on a chloroethylene polymer which is resistant to the effects of light over prolonged periods of exposure to direct sunlight.

Another object of the invention is to provide plasticized and stabilized polymers which have little or no color, enabling the production of clear or white articles therefrom.

The above and related objects of the invention are achieved with a polymeric haloethylene composition and stabilizing and plasticizing quantities of polycarboxylic ester having the general formula:

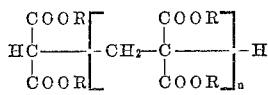

wherein R is an alkyl group containing 1 to 12 carbon atoms and n is an integer from 1 to 3.

Among the specific compounds defined by the foregoing formula and which have plasticizing and light stabilizing action in haloethylene polymers are:

1,1,3,3-propanetetracarboxylic acid; tetralauryl ester
1,1,3,3-propanetetracarboxylic acid; tetrabutyl ester
1,1,3,3-propanetetracarboxylic acid; tetraoctyl ester
1,1,3,3,5,5-pentanehexacarboxylic acid; hexaethyl ester
1,1,3,3,5,5-pentanehexacarboxylic acid; hexabutyl ester
1,1,3,3,5,5-pentanehexacarboxylic acid; hexahexyl ester
1,1,3,3,5,5,7,7-heptaneoctacarboxylic acid; octamethyl ester
1,1,3,3,5,5,7,7-heptaneoctacarboxylic acid; octaethyl ester
1,1,3,3,5,5,7,7-heptaneoctacarboxylic acid; octapropyl ester The stabilizing and plasticizing agents of this invention are white or light-colored solids, except the lowest members of the group, which are light-colored viscous liquids. The solid members are preferred for most compositions although the liquids have very low volatility and are effective plasticizers and stabilizers. The compounds are characterized as fully esterified materials not containing free carboxyl groups. The compounds may be easily prepared from readily available materials by a number of known methods. For example, 1,1,3,3,5,5-pentanehexacarboxylic acid; hexaethyl ester may be prepared by reacting diethyl malonate with formaldehyde in the manner described in Organic Syntheses, Collective Vol. I, 2nd ed., 1941, p. 290.

Although a wide variety of thermoplastic materials may be plasticized and stabilized in accordance with this invention, particularly advantageous results are obtained with haloethylene polymers, such as the polymers of vinyl chloride or vinylidene chloride, the copolymers of vinyl chloride with other monomers copolymerizable therewith, such as vinyl acetate, acrylonitrile or alkyl acrylates, copolymers of vinyl chloride and vinylidene chloride, and the copolymers of vinylidene chloride with copolymerizable monomers, such as vinyl acetate, acrylonitrile or alkyl acrylates in which the vinylidene chloride is present in an amount of at least 50 percent by weight. The haloethylene polymers present an unusual problem with respect to degradation by light, in that once degradation or discoloration has started the effect appears to be autocatalytic or at least accelerated.

The esters of this invention may be employed in amounts of from 1 to 12 percent, preferably 2 to 8 percent, by weight based on the weight of the polymer employed. Most polymeric compositions comprise many ingredients such as fillers, pigments and heat stabilizers and the esters of this invention may be employed in the compositions in conjunction with such additives without any adverse effects. Likewise, the compounds may be used in conjunction with other known plasticizers and light stabilizers. The ingredients may be intermixed by milling or blending by known conventional methods.

The compositions of this invention show superior resistance to degradation due to light and exhibit improved plasticized properties over prior compositions. This superiority will be more apparent from the following illustrative examples in which all parts are by weight.

*Example I*

A series of samples were made consisting of 92 parts of a copolymer prepared from a monomeric mixture consisting of 85 percent vinylidene chloride and 15 percent vinyl chloride, 7 parts tributyl aconitate as a plasticizer, 0.4 part of tetrasodium pyrophosphate as a heat stabilizer, 0.2 part citric acid and 0.05 part maleic anhydride. One of the samples was left as a blank, to one was added 4 parts of salol, a known light stabilizer, and to one was added 3 parts of 1,1,3,3,5,5-pentanehexacarboxylic acid; hexaethyl ester. Each sample was molded into sheets 0.01 inch thick. Some of the sheets were exposed to General Electric RSI sunlamps. Others were exposed to direct sunlight in the State of Arizona. The extent of discoloration was rated according to color standards ranging from 0 (no browning) to 19 (dark brown). The results are set forth in the following table:

| Additive | Parts | Color Change After Exposure | | | | |
|---|---|---|---|---|---|---|
| | | Hours RSI Sunlamp | | Arizona UVSH | | |
| | | 160 | 320 | 125 | 250 | 750 |
| None | | 0 | 6 | 0 | 0 | ≥19 |
| Salol | 4 | 0 | 1 | 1 | 1 | ≥19 |
| 1,1,3,3,5,5-hexacarbethoxy-pentane | 3 | 0 | 1 | 0 | 0 | 14 |

*Example II*

A series of samples were made consisting of 90 parts of a copolymer prepared from a monomeric mixture consisting of 85 percent vinylidene chloride and 15 percent vinyl chloride, 0.4 part of tetrasodium pyrophosphate as a heat stabilizer, 0.2 part citric acid, 0.05 part maleic anhydride, 1 part dibenzoylresorcinol as a light stabilizer and 1 part of titanium dioxide. To one sample was added 7 parts of tributyl aconitate, a known plasticizer and to another was added 7 parts of 1,1,3,3,5,5-pentanehexacarboxylic acid; hexaethyl ester. The compositions were extruded into monofilaments 0.01 inch in diameter. The filaments were wound on polystyrene cards about 0.10 inch apart and were exposed to Arizona sunlight. The extent of browning was determined as in Example I. Other samples of the filaments were maintained in relaxed condition in a water bath at 95° C. until the filaments had shrunk 3 percent in length. The results are set forth in the following table:

| Additive | Parts | Color Change After 750 Arizona UVSH | Hours To Shrink 3% |
|---|---|---|---|
| Tributyl aconitate | 7 | >12 | 12 |
| 1,1,3,3,5,5-hexacarbethoxypentane | 7 | 10 | 100 |

*Example III*

A composition was prepared consisting of:

| | Parts |
|---|---|
| Polyvinyl chloride | 95 |
| 1,1,3,3,5,5,7,7-heptane octacarboxylic acid; octaethyl ester | 5 |

The above composition exhibited much greater stability again discoloration by ultraviolet light than did unstabilized polyvinyl chloride. The sample also exhibited satisfactory plasticized properties.

It can be seen that the compositions of the invention exhibit improved stability to ultraviolet light and also possess improved plasticized properties.

I claim:

1. A composition of matter comprising a haloethylene polymer and from 1 to 12 percent of the weight of said polymer of an ester having the general formula:

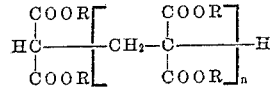

wherein R is an alkyl group containing 1 to 12 carbon atoms and $n$ is in integer from 1 to 3.

2. The composition claimed in claim 1 containing from 2 to 8 percent of the weight of the polymer of said ester.

3. The composition claimed in claim 1 wherein said polymer consists of a polymer of vinylidene chloride.

4. The composition claimed in claim 1 wherein said polymer is a copolymer composed of at least 50 percent by weight of vinylidene chloride.

5. The composition claimed in claim 1 wherein said polymer is a copolymer of vinylidene chloride and vinyl chloride.

6. The composition claimed in claim 1 wherein said ester is 1,1,3,3,5,5-pentanehexacarboxylic acid; hexaethyl ester.

7. The composition claimed in claim 1 wherein said ester is 1,1,3,3,5,5,7,7-heptaneoctacarboxylic acid; octaethyl ester.

References Cited in the file of this patent

UNITED STATES PATENTS

| 2,273,262 | Hanson et al. | Feb. 17, 1942 |
| 2,687,429 | Dazzi | Aug. 24, 1954 |
| 2,806,011 | Dazzi | Sept. 10, 1957 |
| 2,859,196 | Reid et al. | Nov. 4, 1958 |
| 2,897,230 | Dazzi | July 28, 1959 |